United States Patent

Boyde et al.

(10) Patent No.: US 10,316,764 B2
(45) Date of Patent: Jun. 11, 2019

(54) METHOD FOR OPERATING AN INTERNAL COMBUSTION ENGINE

(71) Applicant: MTU FRIEDRICHSHAFEN GMBH, Friedrichshafen (DE)

(72) Inventors: Jan Boyde, Friedrichshafen (DE); Wolfgang Fimml, Hörbranz (AT); Erika Schäfer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/122,244

(22) PCT Filed: Feb. 5, 2015

(86) PCT No.: PCT/EP2015/000233
§ 371 (c)(1),
(2) Date: Aug. 29, 2016

(87) PCT Pub. No.: WO2015/128057
PCT Pub. Date: Sep. 3, 2015

(65) Prior Publication Data
US 2016/0369708 A1 Dec. 22, 2016

(30) Foreign Application Priority Data
Feb. 27, 2014 (DE) .......... 10 2014 002 737

(51) Int. Cl.
F02D 13/02 (2006.01)
F02D 41/00 (2006.01)
F02D 41/10 (2006.01)
F02D 41/14 (2006.01)

(52) U.S. Cl.
CPC ....... *F02D 13/0223* (2013.01); *F02D 13/023* (2013.01); *F02D 41/0002* (2013.01); *F02D 41/008* (2013.01); *F02D 41/107* (2013.01); *F02D 2041/001* (2013.01); *F02D 2041/002* (2013.01); *F02D 2041/0022* (2013.01); *F02D 2041/141* (2013.01);
(Continued)

(58) Field of Classification Search
CPC .. F02D 13/0223; F02D 41/107; F02D 41/008; F02D 41/0002; F02D 13/023; F02D 2041/0022; F02D 2041/002; F02D 2041/1409; F02D 2041/141; F02D 2041/001; Y02T 10/42; Y02T 10/18
USPC .......................................... 123/344
See application file for complete search history.

(56) References Cited

U.S. PATENT DOCUMENTS 8,701,605 B2   4/2014 Okada et al.
2002/0179052 A1* 12/2002 Ganser .......... F02D 41/222
123/406.16
(Continued)

FOREIGN PATENT DOCUMENTS

DE   112009004712 T5   8/2012
DE   102012014713 A1   1/2014
EP        2278140 A1 *  1/2011  ......... F02D 13/0226
(Continued)

Primary Examiner — Joseph J Dallo
Assistant Examiner — Scott A Reinbold
(74) Attorney, Agent, or Firm — Lucas & Mercanti, LLP; Klaus P. Stoffel

(57) ABSTRACT

A method and an arrangement for operating an internal combustion engine. According to the method, a load threshold is defined below which load control by a throttle valve is performed.

7 Claims, 2 Drawing Sheets

Figure 1:
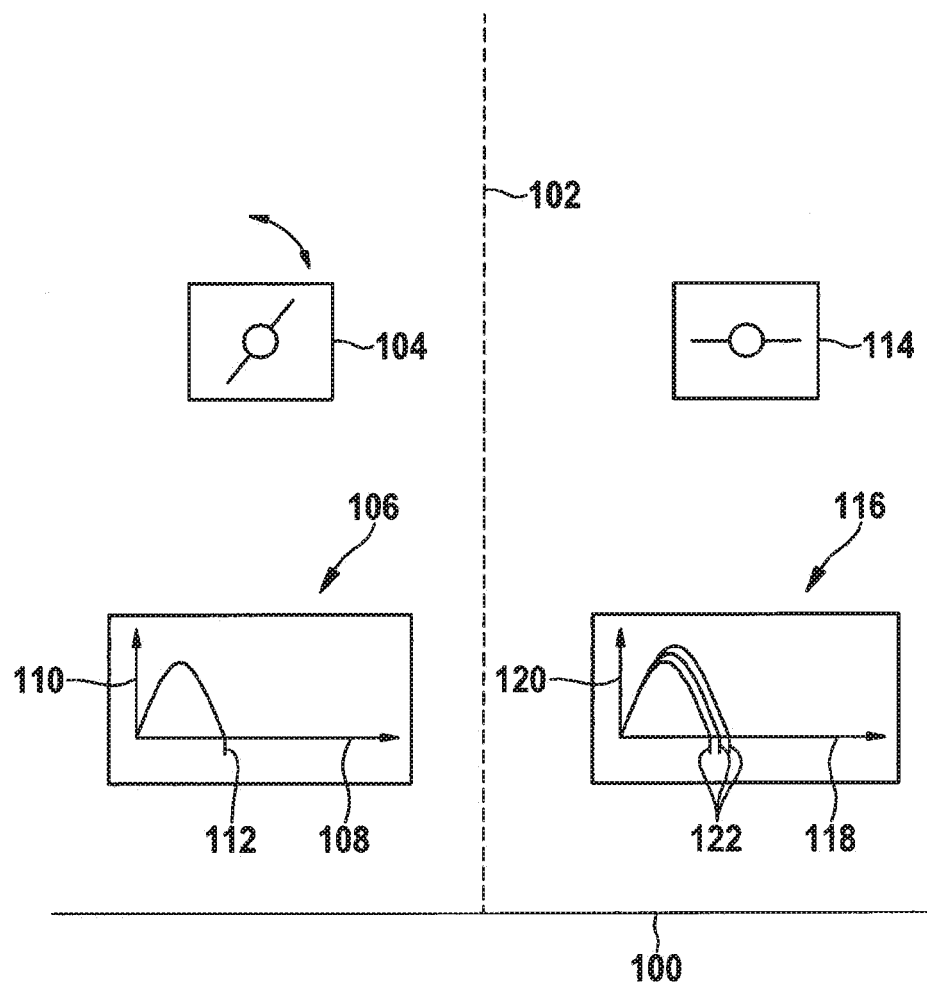

(52) U.S. Cl.
CPC ....... *F02D 2041/1409* (2013.01); *Y02T 10/18* (2013.01); *Y02T 10/42* (2013.01)

(56) References Cited

U.S. PATENT DOCUMENTS

2006/0037578 A1\*  2/2006  Nakamura ............... F01L 1/185
                                                        123/198 F
2015/0134230 A1    5/2015  Hoffmeyer et al.

FOREIGN PATENT DOCUMENTS

EP    2508737 A1   10/2012
FR    2942003 A1    8/2010

\* cited by examiner

METHOD FOR OPERATING AN INTERNAL COMBUSTION ENGINE

The present application is a 371 of International application PCT/EP2015/000233, filed Feb. 5, 2015, which claims priority of DE 10 2014 002 737.6, filed Feb. 27, 2014, the priority of these applications is hereby claimed and these applications are incorporated herein by reference.

BACKGROUND OF THE INVENTION

The invention relates to a method for operating an internal combustion engine with variable valve drive and to an arrangement for carrying out the method.

Internal combustion engines refer to combustion engines which are used as drives in motor vehicles. Internal combustion engines are heat engines which, by way of a combustion process, convert chemical energy of a fuel into mechanical energy. As combustion chambers, cylinders are provided, in which in each case one piston is guided.

Valves are used for the admission of the fuel-gas mixture, which is to be ignited, into the cylinders. In the case of diesel engines, inlet valves are used for the admission of pure air. Fuel is injected by way of injection nozzles. In the case of gas engines, a pre-compressed air-gas mixture is introduced into the cylinders via inlet valves. For the control of the valves, a mechanism is provided which is referred to as valve controller or valve drive. By opening and closing the valves, the charge exchange of the internal combustion engine is controlled. In general, valves are opened by a camshaft, which is driven by a crankshaft, via a tappet. Here, "charge exchange" refers to the exchange of the mixture contained in the cylinder.

A variable valve drive or a variable valve controller makes it possible to realize a variable opening time, a variable valve lift and a variable spread, and reduces the fuel consumption through the influencing of the charge exchange work, the mixture preparation and the combustion. The load of the engine can be controlled by way of a variable valve drive of said type. For this purpose, so-called valve control management (VCM) is required. It is thus possible for the load and thus the power of the engine to be controlled, and thus also regulated, by influencing the opening and closing times of the individual cylinders.

It must be taken into consideration that, in the low-load range, the handling of the variable valve drive system is impeded because the valve must be braked during its upward movement and closed again in order to realize short opening times. This comes at the cost of precision, and is technically not practicable for very short valve opening times.

A further problem consists in the determination of the air mass in the cylinder. In the case of a variable valve drive system, an air mass sensor is installed, but this exhibits only inadequate accuracy in the presence of the low air mass flows that prevail in the low-load range.

SUMMARY OF THE INVENTION

A method for operating an internal combustion engine with variable valve drive is proposed, wherein the internal combustion engine comprises at least one cylinder to which there is assigned in each case at least one inlet valve, wherein load regulation is performed in the case of which, above a defined load threshold, a throttle flap is opened and a regulator predefines, as a control variable, a valve timing for each cylinder, and, below the load threshold, the load regulation is performed by way of the throttle flap and a fixed value for the valve timing is predefined.

The throttle flap is a component which is situated in the intake pipe to the inlet valve. By way of said throttle flap, the flow rate to the inlet valve can be regulated. Said throttle flap is in most cases composed merely of a rotatably mounted plate. In the closed state, the intake pipe is closed off by the throttle flap.

In one embodiment, the load threshold is set to a value of approximately ⅛ of the maximum load.

It may be provided that, above the load threshold, the throttle flap is fully opened.

Also proposed is an arrangement for operating an internal combustion engine with variable valve drive, wherein the internal combustion engine comprises at least one cylinder to which there is assigned in each case at least one inlet valve. Said arrangement is in particular suitable for carrying out a method as discussed above. The arrangement is designed for performing load regulation, for which purpose there are provided a regulator, which predefines, as a control variable, a valve timing for each cylinder, and a throttle flap, which is provided for actuation in a manner dependent on the load.

It is consequently possible, by way of the combination of a throttle flap with a variable valve drive, for the low-load regulation of the engine to be improved. In the described method, below a defined part-load, the power of the engine is regulated by way of a throttle flap and a fixed angle for an inlet valve closing time. Above the defined part-load, the throttle flap is fully opened, and the power is regulated by virtue of the inlet valve closing time being preset. This solves the two abovementioned problems. The inlet valve can thus remain open for longer, which simplifies handling. At the same time, the air mass flow can be determined by way of a volumetric efficiency characteristic map.

It must be noted that, with a variable valve drive system, in particular relatively small valve lifts are technically difficult to implement because the valve must be intercepted during its upward movement in order to arrive at the valve seat at the correct closing time. Furthermore, in the case of systems with an air mass sensor, it is difficult to measure the air mass in the low-load range because the air mass sensor is designed for the air mass in the maximum-load range. Through the fixing of the inlet valve closing time, it is now possible for the air mass to be estimated with sufficient accuracy by way of an air mass with sufficient accuracy by way of a volumetric efficiency characteristic map.

Also proposed is a supplementary method which serves for the operation of an internal combustion engine with variable valve drive, wherein the internal combustion engine comprises at least one cylinder to which there is assigned in each case at least one inlet valve. Here, above the load threshold, the load or power regulation is performed by virtue of a regulator, for example a single-loop regulator, for example a PI regulator, predefining, as a control variable, a valve timing for each cylinder. The valve timing of each cylinder is adapted by way of a pilot-control value. The control variable thus comprises valve timings for each cylinder, with which the at least one inlet valve assigned to the cylinder is actuated in each case, wherein a closing angle or a closing time is predefined.

In one embodiment, the pilot-control value is added, that is to say the control variable is increased by the pilot-control value.

In one refinement, the pilot-control value is determined from a load jump increase and a setpoint load in each case at a time t. It is also alternatively or additionally possible for a rotational-speed jump increase and a setpoint rotational speed to be taken into consideration in the determination of the pilot-control value.

The proposed method may be used in a diesel engine or a gas engine.

Also proposed is a supplementary arrangement for operating an internal combustion engine with a variable valve drive, wherein the internal combustion engine comprises at least one cylinder to which there is assigned in each case at least one inlet valve. The arrangement is in particular suitable for carrying out a method as discussed above. Here, the arrangement is designed for performing load regulation, for which purpose there are provided a regulator, which predefines, as a control variable, a valve timing for each cylinder, and an element which adapts the valve timing of each cylinder by way of a pilot-control value. As an element, use is made, for example, of a summing element.

In particular in the case of engines which are subject to intense fluctuations in load, it is possible by way of the proposed method for a drop in the rotational speed as a result of a load jump to be reduced. Furthermore, in the event of a shedding of load, intense overspeeding, which can be perceived by the driver as annoying, can be intercepted.

Thus, the determination of a dataset of valve timings or load pairs for the pilot control is performed in such a way that, for a demanded load, there is stored a suitable valve timing. In this way, in the case of a gas engine, in which the load demand is known from the generator signal, the valves can be actuated in an extremely short time such that the demanded load can be reproduced. Without this pilot control, the regulator requires a much longer period of time to set the correct valve timing. The additionally provided, for example single-loop regulator compensates relatively small deviations in rotational speed.

The supplementary method thus makes it possible, in the event of intense increases and decreases in load of an engine, for the drop or increase in rotational speed of the engine to be intercepted.

Further advantages and embodiments of the invention will emerge from the description and from the appended drawing.

It is self-evident that the features mentioned above and the features yet to be discussed below may be used not only in the respective specified combination but also in other combinations or individually without departing from the scope of the present invention.

BRIEF DESCRIPTION OF T DRAWING

The invention is schematically illustrated on the basis of embodiments in the drawing and will be described in more detail below with reference to the drawing.

Figure 2:
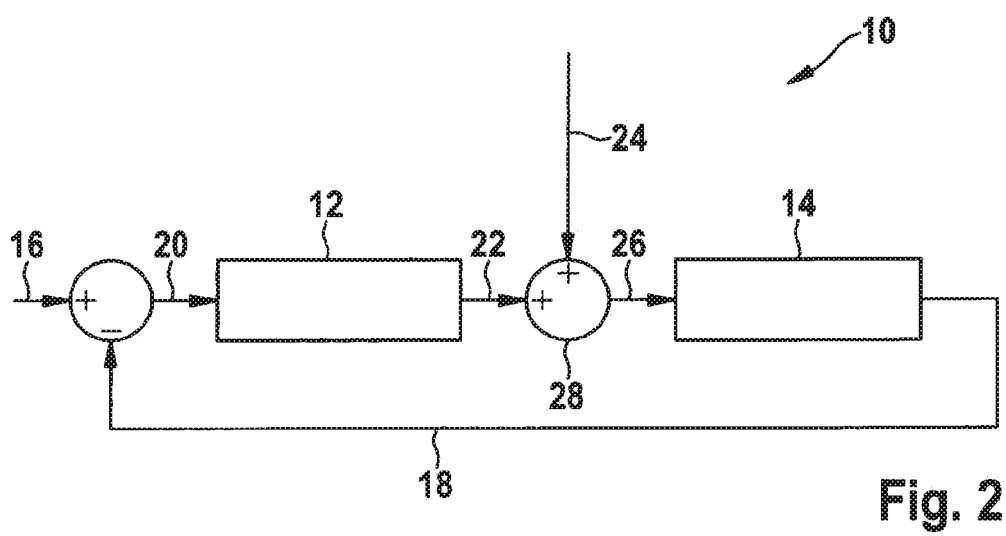
Figure 3:
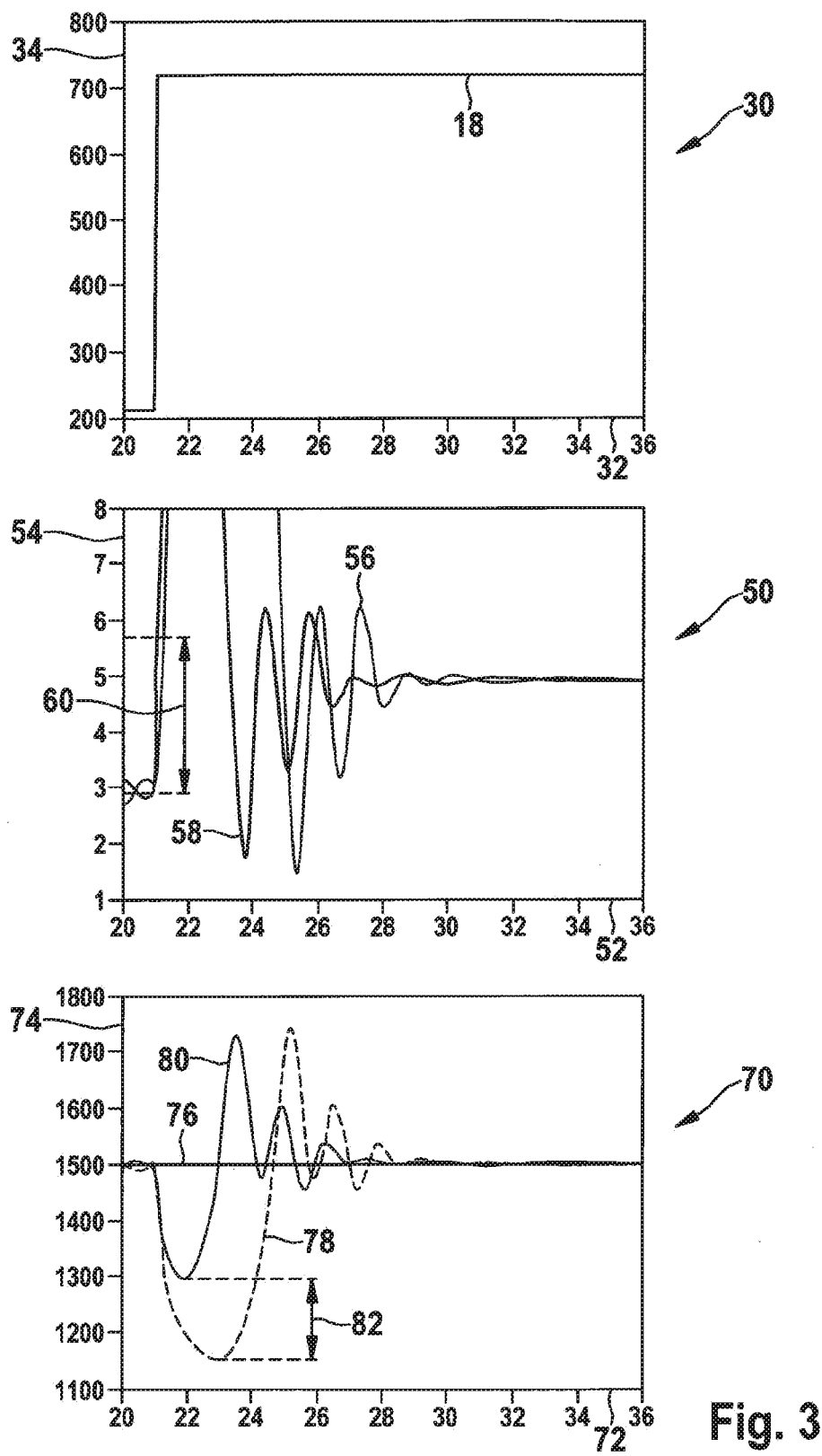

FIG. 1 shows an embodiment of the described method.
FIG. 2 shows the process of a supplementary method.
FIG. 3 shows signal profiles in three graphs.

DETAILED DESCRIPTION OF THE INVENTION

FIG. 1 illustrates the load regulation using a throttle flap. The illustration shows an arrow 100, on which the load is plotted from 0% to 100%. The illustration also shows a load threshold 102 which is indicated by a dashed line and which is also referred to as low-load threshold. Said load threshold lies, in this embodiment, at approximately 200 kW, which corresponds to ⅛ of the maximum load.

Below the load threshold 102, a throttle flap 104 is slightly open. The excursion of the inlet valve is illustrated in a graph 106, on the abscissa 108 of which an angle Φ is plotted and on the ordinate 110 of which the excursion is plotted. The inlet valve closing angle Φs 112 is constant. The load regulation is performed by way of the throttle flap 104.

Above the load threshold 102, a throttle flap 114 is open. The excursion of the inlet valve is illustrated in a graph 116, on the abscissa 118 of which an angle Φ is plotted and on the ordinate 120 of which the excursion is plotted. The inlet valve closing angle Φs 122 changes in a manner dependent on the excursion. The load regulation is performed by way of the inlet valve closing angle Φs 122 and thus by way of a valve control management arrangement which predefines the valve timings. Thus, for the load regulation, a valve timing is predefined for each cylinder.

FIG. 2 describes the principle of the valve pilot control in accordance with the supplementary method. This is used in the case of an internal combustion engine with variable valve drive which makes it possible for the valve timing of each individual cylinder to be predefined. The cylinders are thus individually controllable. It is to be noted that the method is used in the context of global regulation of the load or power of the internal combustion engine, wherein pilot control may be predefined for each cylinder individually.

FIG. 2 shows a regulating loop which constitutes an embodiment of the described arrangement and which is denoted overall by the reference designation 10. The illustration shows a regulator 12, in this case a PI regulator, and an internal combustion engine 14. As input variable 16 of the regulating loop 10, use is made of the value Load Setpoint $l^r$ and thus the setpoint load of the internal combustion engine at the time t. A difference of said variable in relation to the regulating variable 18 Load Actual $l^r$, the actual load at the time t, forms an input variable 20 of the regulator 12. The latter outputs a control variable 22, the valve timing for each individual cylinder. Before said control variable 22 is input into the internal combustion engine 14, a pilot-control value 24, specifically ΔVCM=f (Δ Load Setpoint $l^r$, Load Setpoint $l^r$), is in this case added to said control variable, so as to give an adapted or increased control variable 26 for the redefinition of the valve timing of the individual cylinders, typically in relation to the dead centers of the individual cylinders.

Said pilot-control value 24 is determined from the change in the setpoint load at the time t or the load jump magnitude at the time t and the setpoint load at the time t. For the adaptation of the control variable 22, an element 28 is provided which, in the case of the embodiment shown, is in the form of a summing element and which adds the pilot-control value 24 to the control variable 22 in order to thereby obtain the adapted control variable 26. The pilot-control value 24 may also alternatively or additionally be determined from a change in the setpoint rotational speed at the time t and the setpoint rotational speed at the time t.

The value for the pilot-control value 24 may basically be calculated or else may be taken from a characteristic map. Said characteristic map may be determined for example by way of a simulation.

Thus, pilot control in the case of an internal combustion engine 14 with variable valve control is performed with fast reaction, the regulator 12 can possibly be dimensioned to be of lower power, such that an excessive overshoot can be prevented. In the event of a load jump, the value for the valve control, specifically the control variable 22, is "artificially" increased, in a manner dependent on the load jump magnitude and the present load, in order that the internal combustion engine 14 reaches its operating point earlier. As control variable 22, and thus also as adapted control variable 26, it is the case here that the closing angle or the closing time of the inlet valve is predefined.

FIG. 3 illustrates, in three graphs, the effects of the described method. The measurements on which the illustrated profiles are based show, in isolated operation, a considerable reduction of the drop in rotational speed. In a first graph 30, the time [s] is plotted on an abscissa 32 and the generator power [kW] is plotted on an ordinate 34. A curve 36 shows the profile, which increases abruptly, of the setpoint power. Said curve 36 exhibits a load increase from 200 kW to 700 kW at 21 s.

In a second graph 50, the time [s] is plotted on an abscissa 52 and the valve control value [° CA] is plotted on an ordinate 54. A first curve 56 shows the profile of the valve control value without pilot control, and a second curve 58 shows the profile of the valve control value with pilot control. The pilot-control value 60 is indicated by a double arrow.

It can be seen that, with the pilot control, the internal combustion engine settles significantly more quickly, and the overshoot is considerably reduced.

In a third graph 70, the time is plotted on an abscissa 72, and the rotational speed [rpm] is plotted on an ordinate 74. A first curve 76 shows the profile of the setpoint rotational speed, a second curve 78 shows the rotational speed profile without pilot control, and a third curve 80 shows the rotational speed profile with pilot control. The pilot control thus yields a considerably reduced drop in rotational speed 82, as indicated by a double arrow.

The invention claimed is:

1. A method for operating an internal combustion engine with variable valve drive, wherein the internal combustion engine comprises at least one cylinder having at least one inlet valve, the method comprising the steps of: performing load regulation above a defined load threshold by opening a throttle valve and predefining, by a regulator, a valve timing for each cylinder as a control variable; and performing the load regulation below the load threshold, by way of the throttle valve and predefining a fixed value for the valve timing, wherein the step of performing the load regulation above the defined load threshold includes the regulator predefining, as the control variable, the valve timing for each cylinder, wherein the valve timing of each cylinder is adapted by adding a pilot-control value to the control variable.

2. The method according to claim 1, including setting the defined load threshold to a value of approximately ⅛ of a maximum load.

3. The method according to claim 1, including fully opening the throttle valve above the defined load threshold.

4. The method according to claim 1, including using a single-loop regulator as the regulator.

5. The method according to claim 1, wherein the pilot-control value is determined from a load jump increase and a setpoint load.

6. An arrangement for operating an internal combustion engine with variable valve drive, wherein the internal combustion engine has at least one cylinder with at least one inlet valve, the arrangement comprising: a regulator that predefines, as a control variable, a valve timing for each cylinder; and a throttle valve provided for actuation in a manner dependent on load, the arrangement being configured to perform load regulation so that above a defined load threshold the throttle valve is opened and the regulator predefines the valve timing for each cylinder as a control variable by adapting the valve timing by adding a pilot-controlled value to the control variable.

7. The arrangement as claimed in claim 6, wherein the regulator is a single-loop regulator.

* * * * *